(12) United States Patent
Chen et al.

(10) Patent No.: US 8,353,981 B2
(45) Date of Patent: Jan. 15, 2013

(54) CONDENSING TUBE AND FILTRATION MODULE THEREOF

(75) Inventors: Jung Hui Chen, Taoyuan County (TW); Yu Hung Lin, Taoyuan County (TW)

(73) Assignee: Chung Yuan Christian University, Tao-Yuan (TW)

( * ) Notice: Subject to any disclaimer, the term of this patent is extended or adjusted under 35 U.S.C. 154(b) by 379 days.

(21) Appl. No.: 12/831,721

(22) Filed: Jul. 7, 2010

(65) Prior Publication Data
US 2011/0284443 A1   Nov. 24, 2011

(30) Foreign Application Priority Data

May 21, 2010  (TW) ............................... 99116348 A
May 21, 2010  (TW) ............................... 99209640 U (51) Int. Cl.
  *B01D 50/00*  (2006.01)

(52) U.S. Cl. ........ 96/221; 165/133; 202/185.1; 210/180
(58) Field of Classification Search .................. 165/133; 203/10; 202/185.1; 96/221; 210/180; 95/288
See application file for complete search history.

(56) References Cited

U.S. PATENT DOCUMENTS
7,762,318 B2 *  7/2010  Yu et al. ...................... 165/133

* cited by examiner

*Primary Examiner* — Robert A Hopkins
(74) *Attorney, Agent, or Firm* — WPAT PC; Justin King (57) ABSTRACT

The present invention discloses a condensing tube and a filtration module thereof. The condensing tube comprises a hollow body having a central hollow compartment; a porous covering layer having gas permeability but being liquid impermeable; and a condensation chamber, being a space formed between the hollow body and the porous covering layer wherein a plurality of fins are provided radially along the hollow body in the condensation chamber to divide the condensation chamber into a plurality of condensation compartments.

13 Claims, 9 Drawing Sheets

CONDENSING TUBE AND FILTRATION MODULE THEREOF

BACKGROUND OF THE INVENTION

1. Field of the Invention

The present invention is generally related to a condensing tube and a filtration module thereof, and more particularly to condensing tube and a filtration module thereof for membrane distillation.

2. Description of the Prior Art

Membrane distillation is a distillation process to separate a high-temperature liquid and a low-temperature liquid by a porous membrane which has gas permeability but being liquid impermeable. Generally, there are four basic configurations for membrane distillation (MD): direct-contact membrane distillation (DCMD), air-gap membrane distillation (AGMD), sweeping-gas membrane distillation (SGMD), and vacuum membrane distillation (VMD). Among them, AGMD exhibits the highest thermal efficiency. AGMD has not only been applied for separation of non-volatile components from water like desalination as other MD configurations, but also been specifically suitable to separate some volatile substances which can not be removed in direct contact membrane distillation (DCMD), e.g. alcohols from an aqueous solution. However, the air gap between the membrane and the condensation surface results in lower permeate flux of AGMD since its configuration presents a new resistance to heat and mass transfer. According WO patent 86/07585A, an AGMD distillation apparatus is disclosed where it indicates that the thickness of the air gap should be between 0.2 mm and 1.0 mm to increase flow rate and reduce heat loss.

In searching the reports on the theory and experiments of AGMD, although some design and manufacturing reports about various membranes having high permeation can be found, the availability of the industrial MD modules is up to now one of the limitations for MD process implementation, even for AGMD. Due to the fact that MD is a non-isothermal process, the design of the MD modules must not only provide good flow conditions, low pressure drop and high packing density but also guarantee a good heat recovery function and thermal stability. Among various module configurations, a flat-sheet membrane in plate and frame modules (Liu, G. L.; Zhu, C.; Cheng, C. S.; Leung, C. W., Theoretical and experimental studies on air gap membrane distillation. *Heat Mass Transf.* 1998. 34, 329) shows the highest permeate flux, but the specific surface area of the membrane per module is the lowest. On the other hand, a hollow fiber module (Cheng, L. H.; Wu, P.-C.; Chen, J. Numerical simulation and optimal design of AGMD-based hollow fiber modules for desalination. *Ind. Eng. Chem. Res.* 2009, 48, 4948) has the highest packing density, but the pressure drop along the fiber is the biggest because of the high ratio of fiber length to the fiber diameter.

Therefore, a membrane distillation module or system having high enough permeate flux to reach the application needs is very important for industries.

SUMMARY OF THE INVENTION

In light of the above background, in order to fulfill the industrial requirements, the invention provides a novel condensing tube and a filtration module to increase the flux of AGMD.

One object of the present invention is to provide a condensing tube, while applied in an air-gap membrane distillation (AGMD) module or system, to not only support the membrane but also provide the selection of different air gap thickness and groove number to thereby increase the permeate flux by adjusting these variable parameters or structures.

One object of the present invention is to provide a filtration module to combine with electric energy, solar energy, or waste heat energy as the heat source to provide temperature difference needed for carrying out membrane distillation so as to achieve the effect of various types of filtration. It is found that membrane distillation is more competitive relative to reverse osmosis when low cost heat energy is available.

One embodiment of the invention discloses a condensing tube, used as a condensing member in membrane distillation. The condensing tube comprises: a hollow body, a porous covering layer, and a condensation chamber. The hollow body has a central hollow compartment. The porous covering layer covers the hollow body and has gas permeability but is liquid impermeable. The condensation chamber is a space formed between the hollow body and the porous covering layer where a plurality of separation members are provided radially along the hollow body in the condensation chamber to divide the condensation chamber into a plurality of condensation compartments.

Another embodiment of the invention discloses a filtration module for membrane distillation. The filtration module comprises a hollow body, a porous covering layer, a casing, an evaporation chamber, and a condensation chamber. The hollow body has a central hollow compartment. The porous covering layer covers the hollow body and has gas permeability but is liquid impermeable. The casing has an inlet for supplying a fluid to be filtered. The evaporation chamber is a space formed between the porous covering layer and the casing and is connected to the inlet of the casing where the evaporation chamber receives the heat from an external heat source to evaporate the fluid. The condensation chamber is a space formed between the hollow body and the porous covering layer and comprises an outlet connecting to the outside of the module where a plurality of separation members are provided radially along the hollow body in the condensation chamber to divide the condensation chamber into a plurality of condensation compartments.

Another embodiment of the invention discloses a filtration module for membrane distillation mainly comprising a plurality of the condensing tubes according to the present invention. The filtration module according to this embodiment comprises a casing, a plurality of hollow bodies, a plurality of porous covering layers, an evaporation chamber, and a plurality of condensation chambers. The casing has an inlet for supplying a fluid to be filtered. Each hollow body has a central hollow compartment and the central hollow compartments connect to each other. The plurality of porous covering layers cover each hollow body and have gas permeability but are liquid impermeable. The evaporation chamber is a space formed between the porous covering layer and the casing and is connected to the inlet of the casing where the evaporation chamber receives the heat from an external heat source to evaporate the fluid. Each condensation chamber is a space formed between the hollow body and the porous covering layer and each condensation chamber comprises an outlet connecting to the outside of the module where a plurality of separation members are provided radially along the hollow body in each condensation chamber to divide each condensation chamber into a plurality of condensation compartments.

In the above filtration module, the hollow body and the plurality of separation members are formed in one piece. The hollow body can be formed by connecting at least one hollow tube together and the cross section of the hollow tube has a finned shape.

In the above filtration module, the external heat source is selected from the group consisting of the following or the combination thereof: resistive heater, infrared heater, Sun, energy recovering from waste.

Another embodiment of the invention discloses a finned condensing tube, used as a condensing member in membrane distillation and being formed by processing one material to comprise a hollow body, a plurality of fins, and a plurality of openings wherein the fins form a plurality of pathways on the hollow body, the pathways connect to the openings but the central hollow portion does not connect to the pathways and the openings.

Another embodiment of the invention discloses a filtration module for membrane distillation, comprising: a casing, at least one finned condensing tubes, and at least one porous covering layer. The at least one finned condensing tube is provided in the casing. Each finned condensing tube is formed by processing one material to comprise a hollow body, a plurality of fins, and a plurality of openings. The fins form a plurality of pathways on the hollow body where the pathways connect to the openings but the central hollow portion does not connect to the pathways and the openings. Each porous covering layer covers the corresponding hollow body and the corresponding fins of each finned tube so that each porous covering layer can only communicate with the outside of each corresponding condensing tube through the pores of the porous covering layer and the openings.

The above filtration module is applicable to one system selected from the group consisting of the following or the combination thereof: water purification system, desalination system, wastewater treatment system, water treatment system for hemodialysis. In addition, the filtration module according to the present invention using one single condensing tube is suitable to be used as a portable module because the permeate flux is increased and thus the size of the module can be compact to be portable for camping or outdoor use especially while the module utilizes solar energy as its heat source. The filtration system using the filtration module of the invention and solar energy does not need electric power and can be applied to produce drinking water for deserts, remote districts, or places without electric power supply.

DESCRIPTION OF THE PREFERRED EMBODIMENTS

What is probed into the invention is a condensing tube and a filtration module. Detail descriptions of the processes and elements will be provided in the following in order to make the invention thoroughly understood. Obviously, the application of the invention is not confined to specific details familiar to those who are skilled in the art. On the other hand, the common processes and elements that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
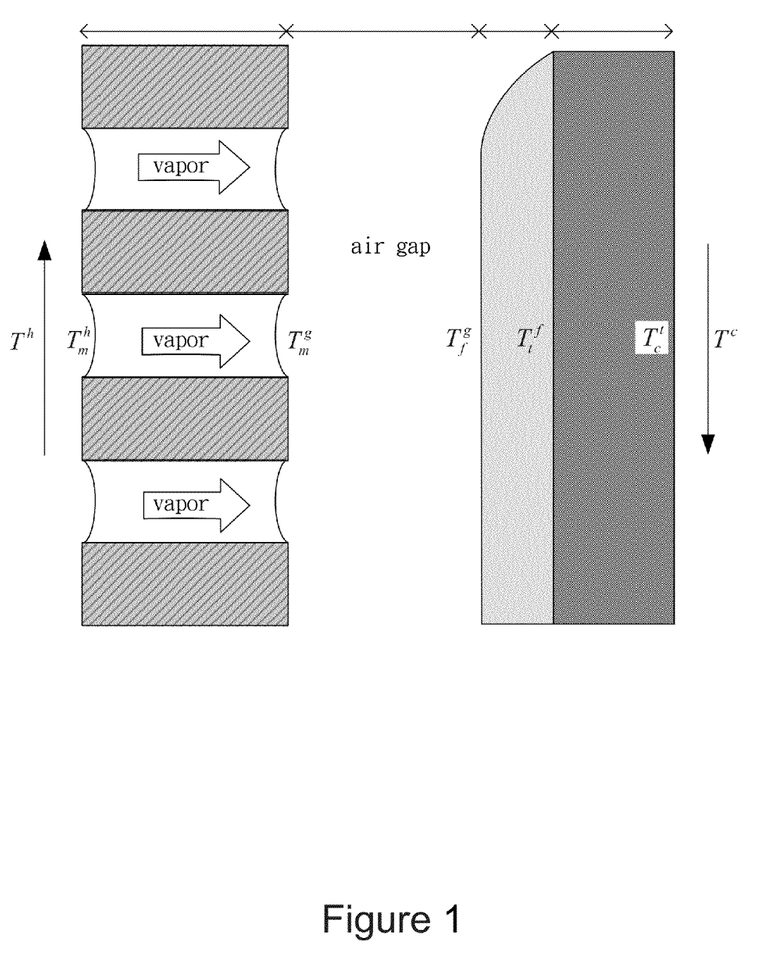
FIG. 1 shows a schematic diagram illustrating the basic operational principle of air-gap membrane distillation (AGMD)

FIG. 1 shows a schematic diagram illustrating the basic operational principle of air-gap membrane distillation (AGMD). As shown in FIG. 1, in an AGMD process, the vapor from the feed side of a higher temperature penetrates through the hydrophobic membrane and then the air gap and condenses on the cooled surface. Since the permeate flux is a function of both the absolute temperature of the membrane at the feed side and the transmembrane temperature difference, in order to achieve a breakthrough in the performance of AGMD and thus appreciably reduce both the costs and the energy consumption of the system, the design of a AGMD module must allow (1) thin air gap but smooth flow of the permeate ($\delta^g + \delta^f$), (2) high feed flow rate and feed temperature ($T^h$), (3) low cold temperature ($T^c$), (4) low temperature variation along the flow direction ($T^h$ and $T^c$), (5) efficient solar energy utilization, (6) easy operation and maintenance, and (7) easy scaling-up.

Therefore, in a first embodiment of the present invention, a condensing tube is provided to be used as a condensing member in membrane distillation. The condensing tube comprises: a hollow body, a porous covering layer, and a condensation chamber. The hollow body has a central hollow compartment. The porous covering layer covers the hollow body and has gas permeability but is liquid impermeable. The condensation chamber is a space formed between the hollow body and the porous covering layer where a plurality of separation members are provided radially along the hollow body in the condensation chamber to divide the condensation chamber into a plurality of condensation compartments.

In one embodiment, the porous covering layer can comprise a porous membrane selected from the group consisting of the following or the combination thereof: polytetrafluoroethylene, polyvinylidene fluoride, cellulose acetate, or polysulfone. In addition, the porous covering layer can comprise a porous membrane and a mesh layer laminated on the porous membrane for supporting. In another embodiment, the surfaces of the separation members contacting with the porous covering layer are provided with a plurality of microstructures like grooves or texture to support the above porous covering layer and maintain the spaces of the condensation compartments. The above condensing tube can further comprise a cooling medium that passes through the central hollow compartment to provide the temperature difference between the feed side and the condensing side. The cooling medium can be, for example, a coolant, water, or air. The hollow body and the plurality of separation members can be formed in one piece. On the other hand, in another embodiment, the hollow body can be formed by connecting at least one hollow tube together and the cross section of the hollow tube has a finned shape. Thus, the length of the hollow body can be adjusted according to the design needs.

Figure 2:
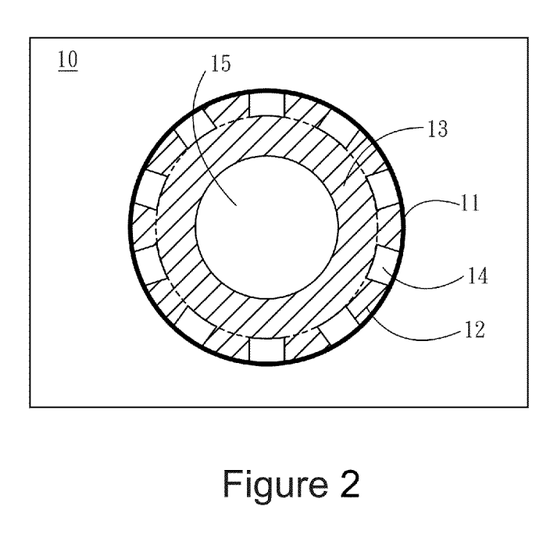
FIG. 2 shows a cross sectional schematic diagram illustrating the condensing tube according to one embodiment of the present invention.

FIG. 2 shows a cross sectional schematic diagram illustrating the condensing tube 10 according to one embodiment of the present invention. As shown in FIG. 2, the condensing tube 10 comprises a hollow body 13, a porous covering layer 11, and a condensation chamber 14. The hollow body 13 has a central hollow compartment 15. The condensation chamber 14 comprises a plurality of fins 12. The hollow body 13 and the fins 12 can be formed in one piece by mechanically processing from a chunk of raw material. The material of the hollow body 13 and the fins 12 can be of metal, alloy, plastics or composite materials as long as the material is non-toxic and does not produce contaminants within the operation temperature range. Besides, the preferred configuration is to have no heat resistance between the feed side and the condensing side, that is, to achieve the highest temperature difference between the feed side and the condensing side. According to this principle, while different material is in use, the design of the condensing tube is adjusted accordingly, such as the length, the width, and the diameter of the hollow body 13, the thickness and width of the separation members, or the number of separation members, etc. to optimize the flux of the whole system. Therefore, the structure of the condensing tube shown in FIG. 2 is only an example and the present invention is not limited to such a structure. The actual structure or configuration will depend on the material in use, the design of the system, and the application requirements.

According to a second embodiment of the present invention, a filtration module for membrane distillation is disclosed. The filtration module comprises a hollow body, a porous covering layer, a casing, an evaporation chamber, and a condensation chamber. The hollow body has a central hollow compartment. The porous covering layer covers the hollow body and has gas permeability but is liquid impermeable. The casing has an inlet for supplying a fluid to be filtered. The evaporation chamber is a space formed between the porous covering layer and the casing and is connected to the inlet of the casing where the evaporation chamber receives the heat from an external heat source to evaporate the fluid. The condensation chamber is a space formed between the hollow body and the porous covering layer and comprises an outlet connecting to the outside of the module where a plurality of separation members are provided radially along the hollow body in the condensation chamber to divide the condensation chamber into a plurality of condensation compartments.

In the above filtration module, the external heat source is selected from the group consisting of the following or the combination thereof: resistive heater, infrared heater, Sun, energy recovering from waste. The porous cover layer can comprise a porous membrane selected from the group consisting of the following or the combination thereof: polytetrafluoroethylene, polyvinylidene fluoride, cellulose acetate, or polysulfone. In addition, the porous covering layer can further comprise a mesh layer for supporting the porous membrane. In another embodiment, the surfaces of the separation members contacting with the porous covering layer are provided with a plurality of microstructures like grooves or texture to support the above porous covering layer and maintain the spaces of the condensation compartments. The above condensing tube can further comprise a cooling medium that passes through the central hollow compartment to provide the temperature difference between the feed side and the condensing side. The cooling medium can be, for example, a coolant, water, or air. The hollow body and the plurality of separation members can be formed in one piece. On the other hand, in another embodiment, the hollow body can be formed by connecting at least one hollow tube together and the cross section of the hollow tube has a finned shape. Thus, the length of the hollow body can be adjusted according to the design needs. The above filtration module is applicable to a water purification system, a desalination system, a wastewater treatment system, a water treatment system for hemodialysis.

Figure 3:
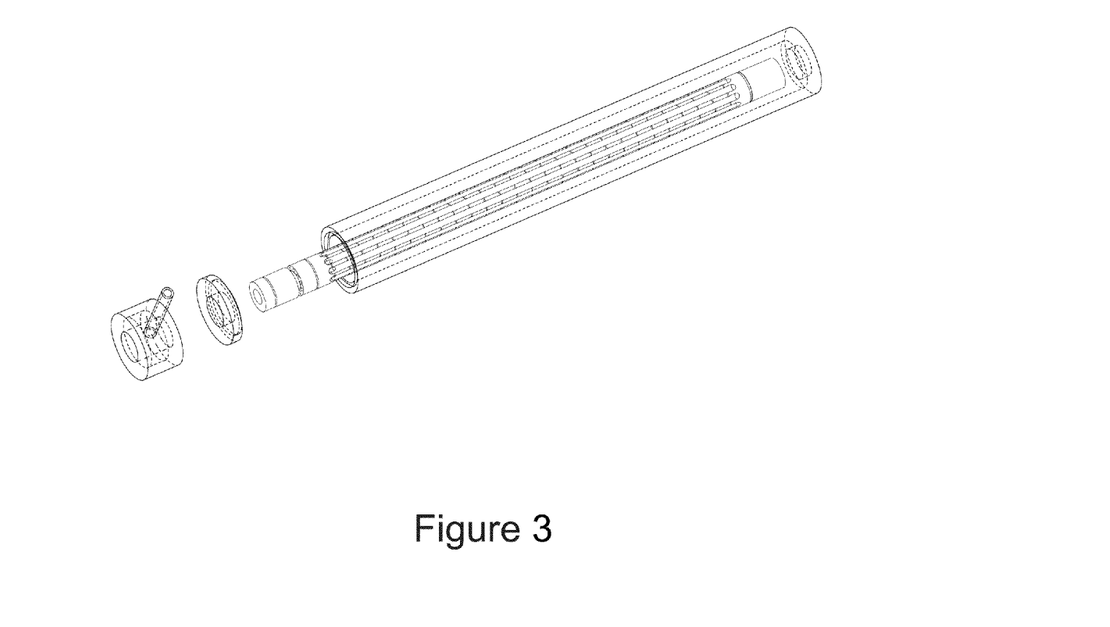
FIG. 3 shows a three-dimensional perspective schematic diagram illustrating the filtration module according to one embodiment of the present invention.
Figure 4A:
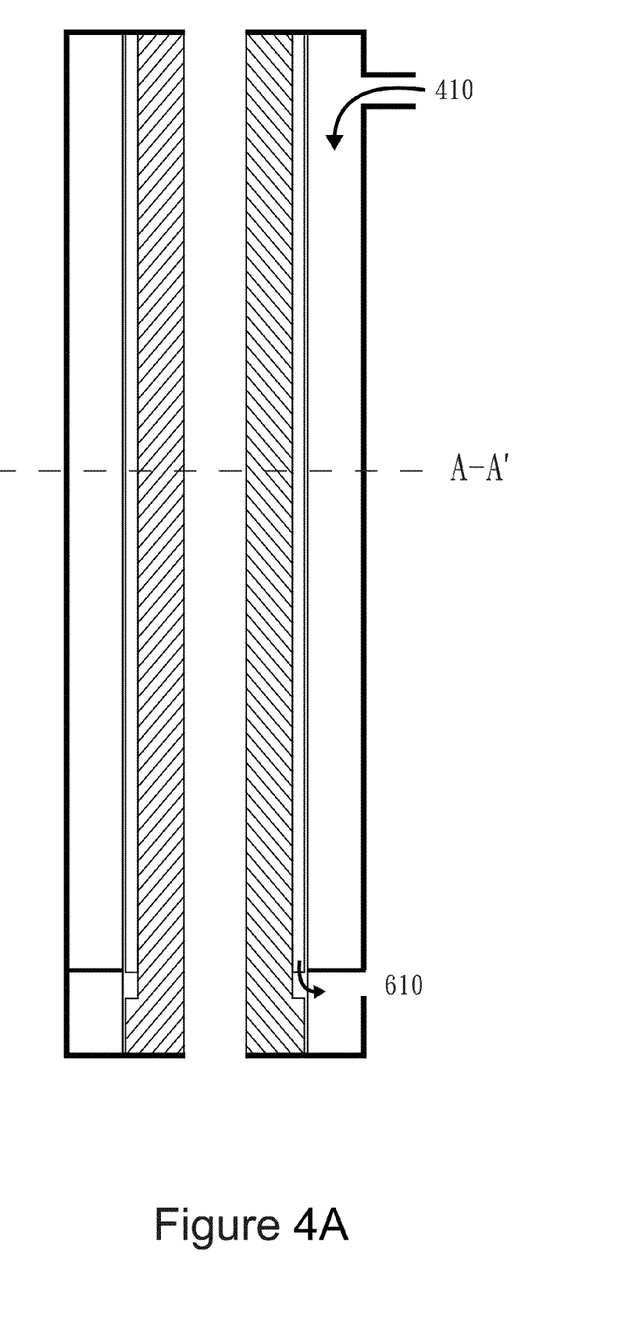
FIG. 4A shows a side-view schematic diagram illustrating the filtration module according to one embodiment of the present invention.
Figure 4B:
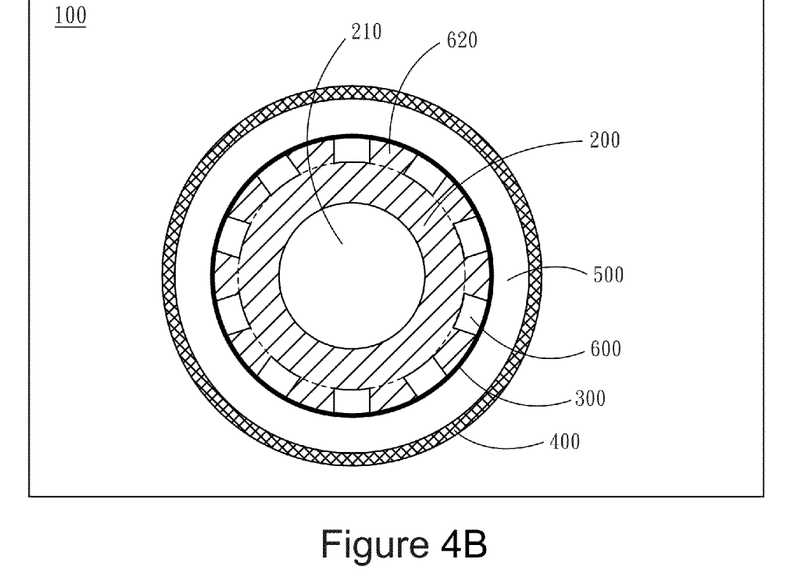
FIG. 4B shows a cross sectional schematic diagram of the filtration module shown in FIG. 4A along the line A-A'.

Specifically, for example, FIG. 3 shows a three-dimensional (3D) perspective schematic diagram illustrating the filtration module according to one embodiment of the present invention. FIG. 4A shows a side-view schematic diagram of the filtration module show in FIG. 3 while FIG. 4B shows a cross sectional schematic diagram of the filtration module shown in FIG. 4A along the line A-A'. The filtration module 100 comprises a hollow body 200, a porous membrane 300, a casing 400, an evaporation chamber 500, a condensation chamber 600. An inlet 410 is provided on the casing 400 and connects to the outside of the filtration module 100 to provide a fluid to be filtered. An outlet 610 connects the condensation chamber 600 and the outside of the filtration module 100 to have a fluid that passes the porous membrane 300 and condenses in the condensation chamber 600 flow out of the filtration module 100 through the outlet 610 for filtrate collection. Besides, a cooling medium (or cool water) passes through the central hollow compartment 210 of the hollow body 200. The central hollow compartment 210 has the hollow cylindrical structure, through the upper opening and the lower opening of which the central hollow compartment 210 can connect to a coolant circulation system to keep its temperature be lower than that of the feed side.

Figure 5:
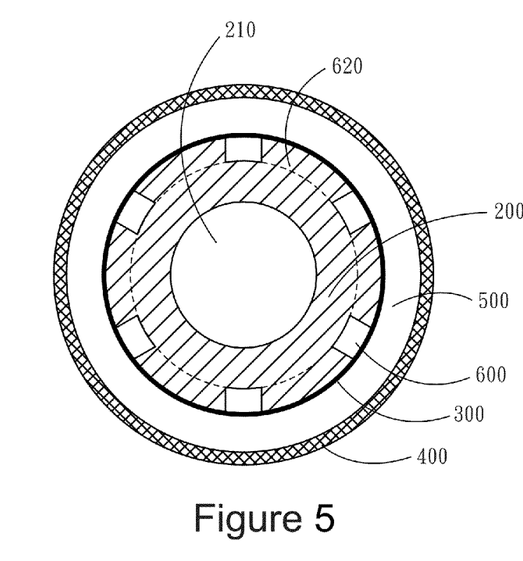
FIG. 5 shows a cross sectional schematic diagram illustrating the filtration module according to another embodiment of the present invention.
Figure 6:
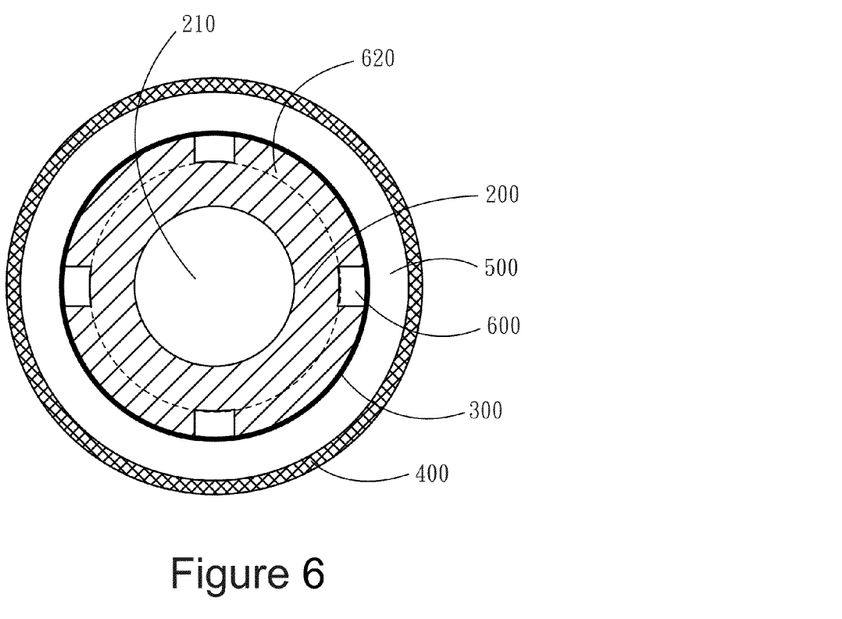
FIG. 6 shows a cross sectional schematic diagram illustrating the filtration module according to another embodiment of the present invention.
Figure 7:
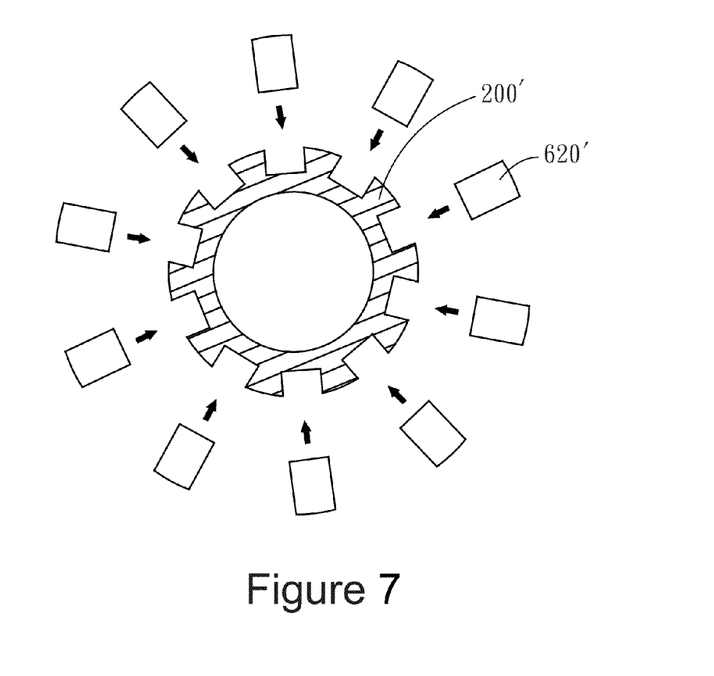
FIG. 7 shows a cross sectional schematic diagram illustrating the structure of the hollow body 200' and the fins 620' according to another embodiment of the present invention.

Obviously, the central hollow compartment 210 of the present invention is not limited to the hollow cylindrical structure. In another embodiment, the central hollow compartment 210 can have the hollow pillared structure. The cross section of the central hollow compartment 210 can be of various shapes. The condensation chamber 600 comprises a plurality of fins 620 that are provided radially along the hollow body 300 in the condensation chamber 600. The cross section of the fin is not limited to the shape shown in FIG. 4B but can be various shapes. The number of fins is not limited to 10 shown in FIG. 4B but can be any other number, like 4 or 6, shown in FIG. 5 and FIG. 6. According to the design of the filtration module, various parameters like process conditions or the shape, size of the separation members (fins) (the ratio of the length to the width of the separation members) can be adjusted to optimize the performance of the filtration module. Referring to FIG. 3, the hollow body 200 and the fins 620 are formed in one piece, for example, by mechanically processing from a hollow copper tube. But, the present invention is not limited to this example. The hollow body 200 and the fins 620 can be provided separately. For example, FIG. 7 shows a cross sectional schematic diagram illustrating the structure of the hollow body 200' and the fins 620' according to another embodiment of the present invention. As shown in FIG. 7, the hollow body 200' can be formed from mechanically processing a hollow tube to have a plurality of grooves be provided on the hollow tube and then is assembled with a plurality of fins 620' by inserting the fins 620' into the grooves on the hollow body 200'. Besides, the hollow body can be formed by connecting a plurality of hollow tubes so that the length of the hollow body can be adjusted as needed. Thus, the length of the hollow body will not be limited by the capability of a mechanical process. In addition, the cost can be reduced and the filtration module can be easily scaled up to achieve the requirement of mass production.

Furthermore, the porous membrane 300 is a polytetrafluoroethylene (PTFE) membrane while, in another embodiment, the porous membrane 300 can comprise a PTFE membrane and a mesh layer (not shown) laminated on the PTFE membrane.

According to a third embodiment of the present invention, a filtration module for membrane distillation is disclosed. The filtration module 100' comprises a plurality of condensing tubes according to the invention.

Figure 8:
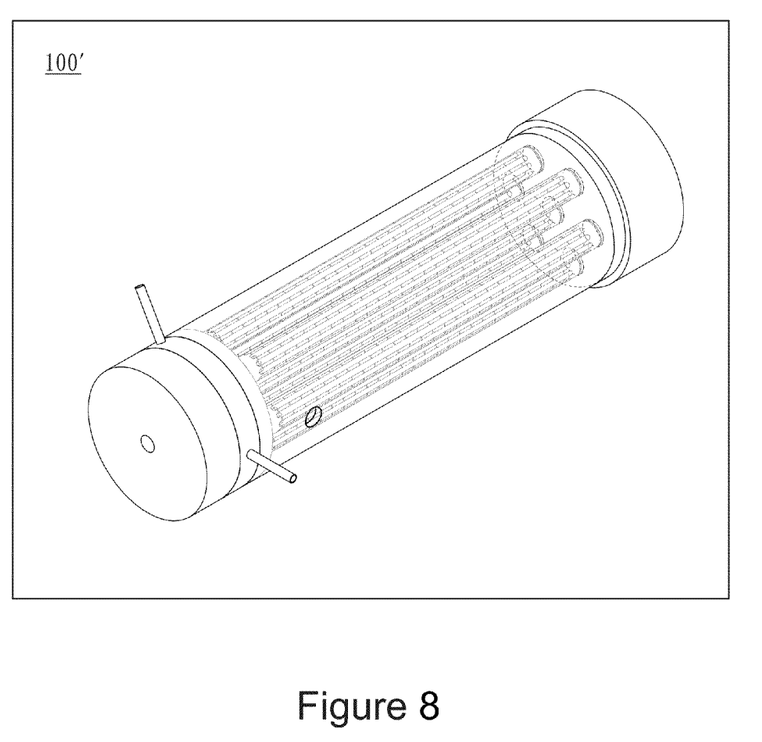
FIG. 8 shows a three-dimensional perspective schematic diagram illustrating the filtration module 100' according to one embodiment of the present invention.

FIG. 8 shows a three-dimensional perspective schematic diagram illustrating the filtration module 100' according to one embodiment of the present invention. The filtration module according to this embodiment comprises a casing, a plurality of hollow bodies, a plurality of porous covering layers, an evaporation chamber, and a plurality of condensation chambers. The casing has an inlet for supplying a fluid to be filtered. Each hollow body has a central hollow compartment and the central hollow compartments connect to each other. The plurality of porous covering layers cover each hollow body and have gas permeability but are liquid impermeable. The evaporation chamber is a space formed between the porous covering layer and the casing and is connected to the inlet of the casing where the evaporation chamber receives the heat from an external heat source to evaporate the fluid. Each condensation chamber is a space formed between the hollow body and the porous covering layer and each condensation chamber comprises an outlet connecting to the outside of the module where a plurality of separation members are provided radially along the hollow body in each condensation chamber to divide each condensation chamber into a plurality of condensation compartments.

The casing of the filtration module 100' can be made of metal, alloy, plastics, or composite materials as long as the heat from the external heat source can be received by the evaporation chamber.

In the above filtration module, the external heat source is selected from the group consisting of the following or the combination thereof: resistive heater, infrared heater, Sun, energy recovering from waste. The porous covering layer can comprise a porous membrane selected from the group consisting of the following or the combination thereof: polytetrafluoroethylene, polyvinylidene fluoride, cellulose acetate, or polysulfone. In addition, the porous covering layer further comprises a mesh layer for supporting the porous membrane. In another embodiment, the surfaces of the separation members contacting with the porous covering layer are provided with a plurality of microstructures like grooves or texture to support the above porous covering layer and maintain the spaces of the condensation compartments. The above condensing tube can further comprise a cooling medium that passes through the central hollow compartment to provide the temperature difference between the feed side and the condensing side. The cooling medium can be, for example, a coolant, water, or air. The hollow body and the plurality of separation members can be formed in one piece. On the other hand, in another embodiment, the hollow body can be formed by connecting at least one hollow tube together and the cross section of the hollow tube has a finned shape. Thus, the length of the hollow body can be adjusted according to the design needs. The outlet is used to collect the filtered fluid that passes the porous covering layer. The above filtration module is applicable to a water purification system, desalination system, wastewater treatment system, or water treatment system for hemodialysis.

According to a fourth embodiment of the present invention, a finned condensing tube is disclosed. The finned condensing tube is used as a condensing member in membrane distillation and formed by processing one material to comprise a hollow body, a plurality of fins, and a plurality of openings. The fins form a plurality of pathways on the hollow body where the pathways connect to the openings but the central hollow portion does not connect to the pathways and the openings.

The finned condensing tube can further comprise a porous covering layer that covers the hollow body and the fins so that the porous covering layer can only communicate with the outside of the condensing tube through the pores of the porous covering layer and the openings. The material of the finned condensing tube can be selected from the group consisting of the following or the combination thereof: metal, alloy, plastics, or composite material.

The porous covering layer can comprise a porous membrane selected from the group consisting of the following or the combination thereof: polytetrafluoroethylene, polyvinylidene fluoride, cellulose acetate, or polysulfone. In another embodiment, the porous covering layer can comprise a porous membrane and a mesh layer laminated on the porous membrane. In another embodiment, the surfaces of the fins contacting with the porous covering layer are provided with a plurality of microstructures like grooves or texture to support the above porous covering layer and maintain the spaces of the pathways.

According to a fifth embodiment of the present invention, a filtration module is disclosed. The filtration module comprises: a casing, at least one finned condensing tubes, and at least one porous covering layer. The at least one finned condensing tube is provided in the casing. Each finned condensing tube is formed by processing one material to comprise a hollow body, a plurality of fins, and a plurality of openings. The fins form a plurality of pathways on the hollow body where the pathways connect to the openings but the central hollow portion does not connect to the pathways and the openings. Each porous covering layer covers the corresponding hollow body and the corresponding fins of each finned tube so that each porous covering layer can only communicate with the outside of each corresponding condensing tube through the pores of the porous covering layer and the openings.

In the fifth embodiment, the casing is divided into a plurality of compartments; the finned condensing tubes and the porous covering layers are provided in a first compartment; the openings of the fins communicate with a second compartment; the second compartment comprises one outlet connecting to the outside of the module; and the central hollow portion of the hollow body of each finned condensing tube communicates together with a third compartment to form a cooling flow path. The cooling flow path allows a cooling medium flowing through. The first compartment comprises one inlet to allow a fluid to be filtered flowing into the first compartment and then flowing out via the outlet of the second compartment. In addition, the casing is formed by a material that can receive the heat from an external heat source. The external heat source can be selected from the group consisting of the following or the combination thereof: resistive heater, infrared heater, Sun, energy recovering from waste.

Figure 9:
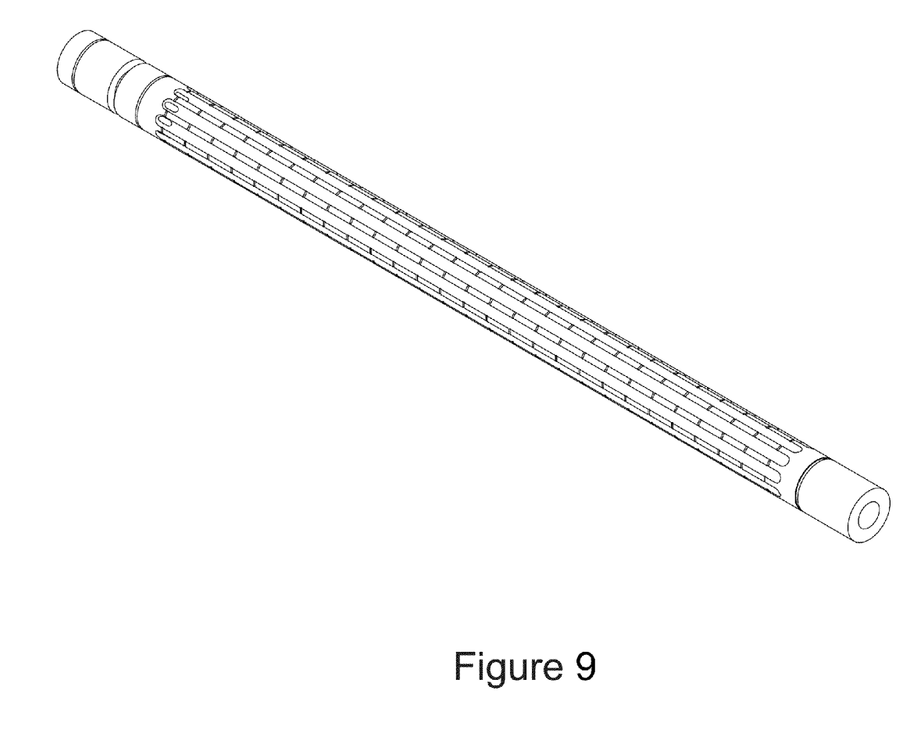
FIG. 9 shows a three-dimensional perspective schematic diagram illustrating the finned condensing tube according to one embodiment of the present invention.
Figure 10:
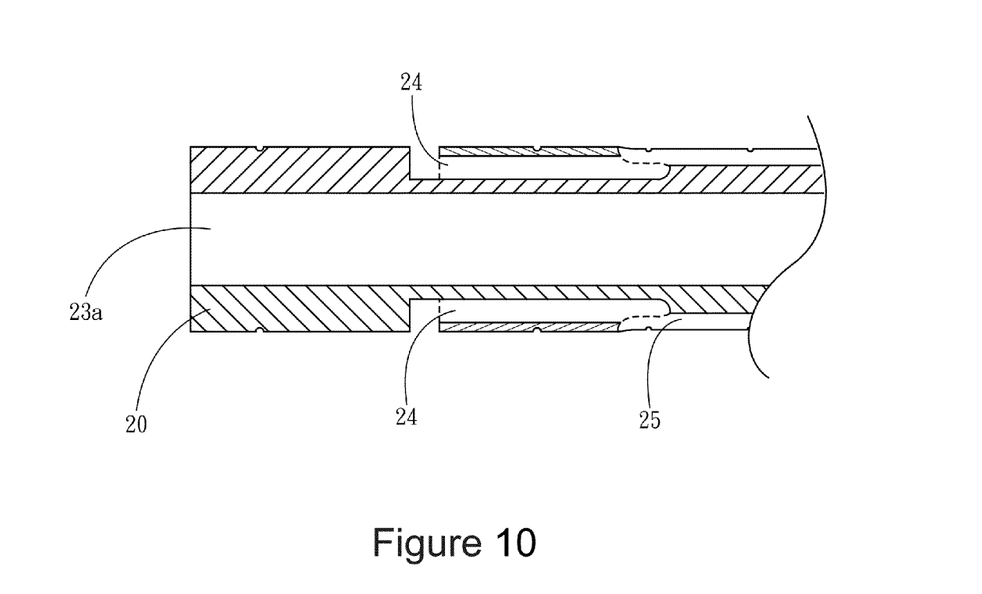
FIG. 10 shows a cross-sectional schematic diagram illustrating the finned condensing tube according to one embodiment of the present invention.
Figure 11:
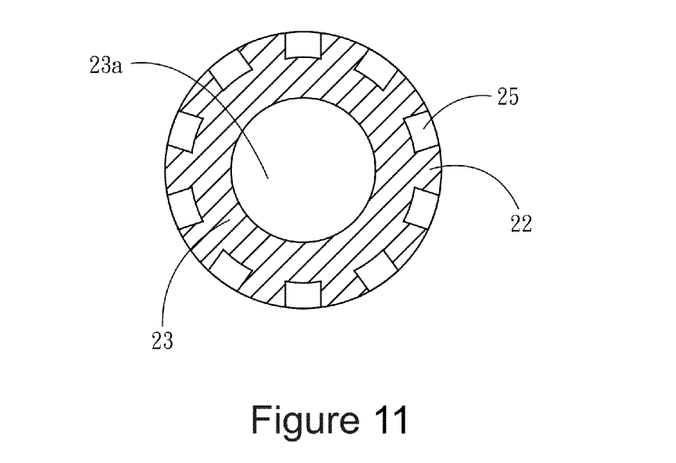
FIG. 11 shows another cross-sectional schematic diagram illustrating the finned condensing tube according to one embodiment of the present invention.

FIG. 9 shows a three-dimensional perspective schematic diagram of the finned condensing tube 20 while FIG. 10 shows a cross-sectional schematic diagram of the finned condensing tube 20. FIG. 11 shows another cross-sectional schematic diagram along another axis of the finned condensing tube 20. As shown in FIG. 10, the finned condensing tube 20 comprises a hollow body 23, a plurality of fins 22, and a plurality of openings 24. As shown in FIG. 11, the finned condensing tube 20 comprises ten fins 22 to divide into ten pathways 25. From the cross-sectional diagram, the thickness and width of the fin 22 determine the space of the pathway 25. By varying the thickness and width of the fin 22, the flux of the filtration module using the finned condensing tube can be changed and optimized. The central hollow portion 23a of the hollow body 23 is to allow a cooling medium flowing through.

Figure 12:
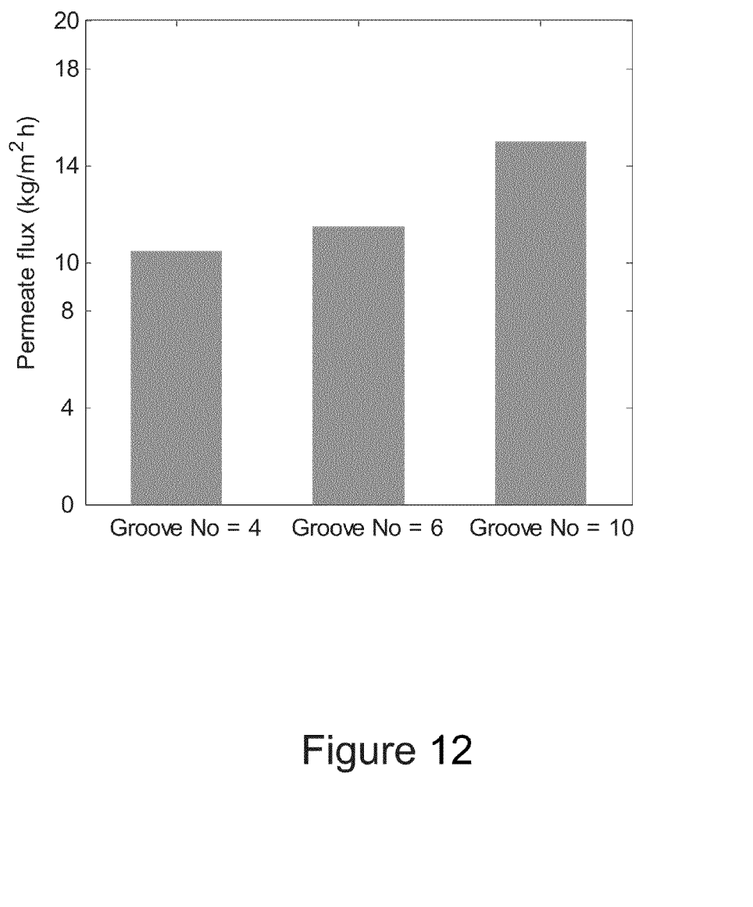
FIG. 12 shows a bar chart illustrating the relation between the number of fins included in the condensing tube and the flux of the filtration module.

FIG. 12 shows a bar chart illustrating the relation between the number of fins included in the condensing tube shown in FIG. 3 and the flux of the filtration module. FIG. 12 shows the effect of the number of fins on the flux of the filtration module where the filtration module in FIG. 3 comprises only one condensing tube. The flux of the filtration module is increased as the increase in the number of fins where the temperature of the condensing side $(T^c)$=303K and that of the feed side $(T^h)$=323K. As the number of fins is increased to 10, the flux is about 15 kg/m²h. For comparison, the AGMD desalination system (referring to C. Feng et al., Journal of Membrane Science, 311 (2008)1-6) disclosed by C. Feng et al. has the max. flux of 11~12 kg/m²h at the temperature difference of 60° C. In another case, solar thermal-driven desalination plants based on membrane distillation (referring to J. Koschkowski et al., Desalination 156(2003) 295-304) has the max. output of about 1.17 kg/m²h. Thus, apparently according to the design of the invention, the filtration module comprising only one condensing tube shown in FIG. 3 has the permeate flux exceeding the currently reported systems. Furthermore, according to the design of the invention shown in FIG. 8 where a plurality of condensing tubes are used in the filtration module, the flux of the system can be further increased and the system can be easily scaled up according to such design. The flux of the system shown in FIG. 8 is measured and is larger than that using only one condensing tube.

In the application of desalination, if saline water having salinity of 7800 ppm is introduced into the filtration module shown in FIG. 3, the output water having salinity of 90 ppm is obtained, compared to salinity of 180 ppm for generally fresh water. From the above experimental result, the filtration module according to the present invention has excellent desalination effect.

In conclusion, the condensing tube according to the present invention is applicable to the AGMD filtration module and can not only support the membrane but also provide the selection of air gap thickness and groove number to thereby increase the permeate flux by adjusting these variable parameters or structures. The filtration module using the above condensing tube applicable to carry out AGMD can be easily scaled up to achieve the purpose of filtration mass production. Moreover, the filtration module according to the present invention combines with electric energy, solar energy, or waste heat energy as the energy source to provide temperature difference to carry out membrane distillation so as to achieve the effect of various types of filtration.

In addition, the filtration module according to the present invention using one single condensing tube is suitable to be used as a portable module because the permeate flux is increased and thus the size of the module can be compact to be portable for camping or outdoor use especially while the module utilizes solar energy as its heat source. The filtration system using the filtration module of the invention and solar energy does not need electric power and can be applied to produce drinking water for deserts, remote districts, or places without electric power supply. Obviously, the filtration module disclosed by the present invention can be integrated with other filtration modules to fulfill specific filtering purposes. For example, a pre-filter or post filter can be integrated with the filtration module disclosed by the present invention.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A finned condensing tube, used as a condensing member in membrane distillation and being formed by processing one material, comprising,
    a hollow body;
    a plurality of fins;
    a plurality of openings; and
    a porous covering layer with a plurality pores, wherein the porous covering layer covers the hollow body and the fins, and the porous covering layer can only communicate with outside of the finned condensing tube through the pores and the openings;
    wherein the fins form a plurality of pathways on the hollow body, the pathways connect to the openings but the central hollow portion does not connect to the pathways and the openings.

2. The finned condensing tube according to claim 1, wherein the material is selected from the group consisting of the following or the combination thereof: metal, alloy, plastics, or composite material.

3. The finned condensing tube according to claim 1, wherein the porous covering layer is a porous membrane.

4. The finned condensing tube according to claim 3, wherein the porous membrane is selected from the group consisting of the following or the combination thereof: polytetrafluoroethylene, polyvinylidene fluoride, cellulose acetate, or polysulfone.

5. The finned condensing tube according to claim 1, wherein the porous covering layer comprises a porous membrane and a mesh layer laminated on the porous membrane.

6. The finned condensing tube according to claim 1, wherein the surfaces of the fins contacting with the porous covering layer are provided with a plurality of microstructures or texture.

7. A filtration module for membrane distillation, comprising:
    a casing;
    at least one finned condensing tube, provided in the casing wherein each finned condensing tube is formed by processing one material to comprise a hollow body, a plurality of fins, and a plurality of openings, the fins form a plurality of pathways on the hollow body, the pathways connect to the openings but the central hollow portion does not connect to the pathways and the openings; and at least one porous covering layer that covers the corresponding hollow body and the corresponding fins of each finned tube so that each porous covering layer can only communicate with the outside of each corresponding condensing tube through the pores of the porous covering layer and the openings.

8. The module according to claim 7, wherein the casing is divided into a plurality of compartments, the finned condensing tubes and the porous covering layers are provided in a first compartment, the openings of the fins communicate with a second compartment, the second compartment comprises one outlet connecting to the outside of the module, and the central hollow portion of the hollow body of each finned condensing tube communicates together with a third compartment to form a cooling flow path.

9. The module according to claim 7, wherein the cooling flow path allows a cooling medium flowing through.

10. The module according to claim 7, wherein the first compartment comprises one inlet to allow a fluid to be filtered flowing into the first compartment and then flowing out via the outlet of the second compartment.

11. The module according to claim 7, wherein the casing is formed by a material that can receive the heat from an external heat source.

12. The module according to claim 11, wherein the external heat source is selected from the group consisting of the following or the combination thereof: resistive heater, infrared heater, Sun, energy recovering from waste.

13. The module according to claim 7, being applicable to one system selected from the group consisting of the following or the combination thereof: water purification system, desalination system, wastewater treatment system, water treatment system for hemodialysis.

* * * * *